United States Patent [19]
Ooya

[11] Patent Number: 5,585,867
[45] Date of Patent: Dec. 17, 1996

[54] PROJECTION TUBE AND ITS APPLICATION IN A VIDEO PROJECTION SYSTEM

[75] Inventor: Tomoyuki Ooya, Takatsuki, Japan

[73] Assignee: Matsushita Electric Industrial Co., Ltd., Osaka, Japan

[21] Appl. No.: 316,559

[22] Filed: Sep. 30, 1994

[30] Foreign Application Priority Data

Nov. 2, 1993 [JP] Japan ................................. 5-274189

[51] Int. Cl.⁶ ............................ H04N 5/74; H04N 9/31
[52] U.S. Cl. ...................... 348/781; 348/785; 348/749; 348/779; 353/101; 353/54
[58] Field of Search ................................ 348/748, 749, 348/776, 778, 779, 781, 785, 805, 825, 826, 827; 313/36, 478, 477 R; 359/649, 708; 353/54, 100, 101, 69; H04N 5/74, 9/31, 5/645, 5/655

[56] References Cited

U.S. PATENT DOCUMENTS 5,298,984  3/1994  Numata .................... 348/778

FOREIGN PATENT DOCUMENTS

| 63-50275 | 3/1988 | Japan . | |
| 0109884 | 5/1991 | Japan | H04N 5/74 |
| 4-11475 | 1/1992 | Japan . | |
| 4-289639 | 10/1992 | Japan . | |
| 5167963 | 7/1993 | Japan | H04N 5/74 |
| 5227503 | 9/1993 | Japan | H04N 5/74 |

Primary Examiner—Micheal H. Lee
Attorney, Agent, or Firm—Ratner & Prestia

[57] ABSTRACT

A projection tube featuring good accuracy in controlling a slant angle between a cathode ray tube and a projection lens, an excellent focusing performance, and further low production cost, and also a video projection systems which utilizes the foregoing projection tube. There are a spacing member to control the slant angle and according to the slant angle, both being built between a cathode ray tube and a radiator.

12 Claims, 5 Drawing Sheets

PROJECTION TUBE AND ITS APPLICATION IN A VIDEO PROJECTION SYSTEM

BACKGROUND OF THE INVENTION

The present invention relates to a projection tube wherein video images are produced, and a video projection system whereby the video images produced by the foregoing projection tube are enlarged and projected.

A prior art projection tube for video projection systems will be explained with the help of FIG. 9.

Figure 9:
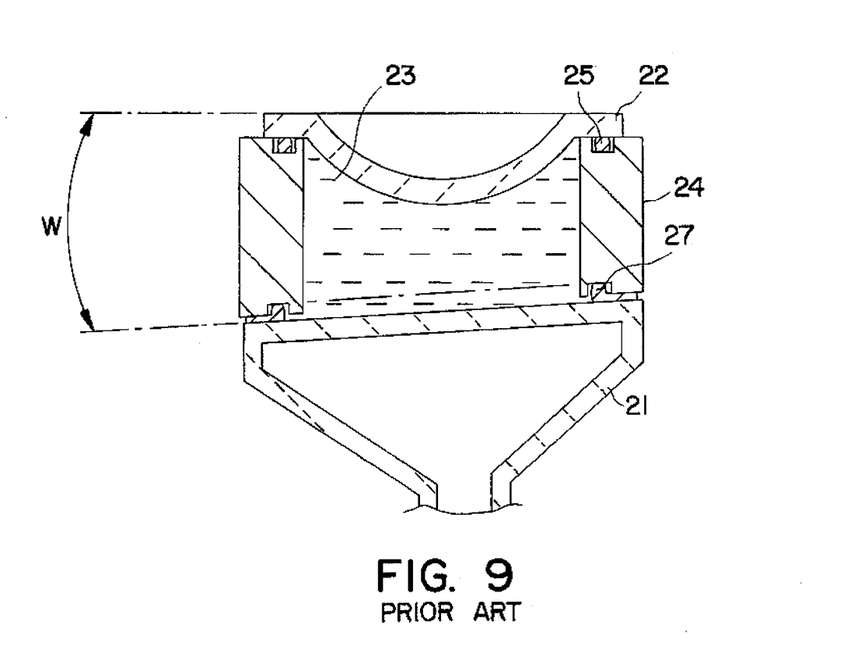
FIG. 9 is a cross-sectional view of the main part of an example of the prior art projection tube.

FIG. 9 is a cross-sectional view to show structures of a main part of a prior art projection tube for video projection systems.

A cathode ray tube 21 and a projection lens 22 are put together by means of a radiator 24 (functioning as a vessel to hold a solution as well), and a solution 23 is filled in the radiator 24.

The junction between the cathode Pay tube 21 and the radiator 24 is mechanically sealed by a uniform thickness sealing member 27 having a flange of a uniform thickness.

The junction between the projection lens 22 and the radiator 24 is mechanically sealed by a sealing member 25.

The angle between the face plane of the cathode ray tube 21 and the projection lens 22 [(W), referred to as "slant angle" hereafter] is adjusted to a required angle by controlling the shape of the radiator 24.

More specifically, the slant angle (W) is controlled by making the height of the respective side walls of the radiator 24 differ from one another to give a different shape to the radiator 24 as a whole, resulting in providing a slant to the radiator 24. Thus, a complete projection tube is structured.

Three projection tubes, i.e. a red color projection tube, a green color projection tube and a blue color projection tube, are arranged, and a screen (not shown in FIG. 9) is disposed in front of the projection tubes, to build a complete video projection system.

In the foregoing set-up, the video images produced on the face plane of the cathode ray tube 21 are enlarged and projected on the screen by the projection lens 22. At this time, the slant angle (W) of each respective projection tube, i.e. the red color, green co)or and blue color projection tubes, is adjusted to an angle different from one another in order to have the positions of the video images from each respective projection tube coincided with one another.

The solution 23 serves the functions of cooling off the heat generated by the cathode ray tube 21 and also enhancing the contrast of video images.

With the prior art structures as described above, the establishment of the slant angle (W) was dependent on the shape of the radiator 24, and each respective projection tube for red, green or blue video image projection required a radiator 24 serving as the structural material thereof and having a specific configuration different from that of other projection tubes.

Furthermore, when a video projection system required optical design figures different from those of other video projection systems, a new specific radiator 24 of a different configuration was needed.

All these factors as described in the foregoing brought about the problem of increased expenses involved with metal dies for production.

Besides, the cathode Pay tube 21 made of glass and the radiator 24 made of metal are put together by means of an elastic and uniform thickness sealing member 27 with a flange structure placed in the junction therebetween in order to prevent leakage of solution and breakage of glass. This structure tended to cause an error in setting a slant angle.

Moreover, a position fixing between the cathode ray tube 21 and the radiator 24 was made inaccurately when the both were put together, resulting in an error in axis alignment between the cathode ray tube 21 and the projection tube 22. All of these factors adversely affected the focusing performance of the video images projected on the screen with a resultant problem of deteriorated video image quality.

SUMMARY OF THE INVENTION

The present invention aims at solving the foregoing problems, and its object is to provide a projection tube having such features as an accurate adjustment of slant angle, an excellent focusing performance and also a reduction in production cost, and a video projection system having an excellent focusing performance and fine picture quality.

A projection tube of the present invention comprises a cathode ray tube, a projection lens disposed in front of the face plane of the cathode ray tube, a radiator arranged between the face plans of the cathode ray tube and the projection lens, a solution filled in the hollow surrounded by the face plane of the cathode ray tube, the projection lens and the radiator, a sealing member placed between the projection lens and the radiator, an angle adjustment spacing member placed between the face plane of the cathode ray tube and the radiator for controlling the slant angle between the cathode ray tube and the projection lens, and an odd shape sealing member disposed between the face plane of the cathode ray tube and the radiator to prevent leakage of the solution.

A video projection system of the present invention comprises a plurality of the projection tubes having the foregoing structures and arranged in specified places, and a screen disposed in front of the projection tubes.

According to the forgoing structures, both the slant angle adjustment and the axis alignment between the cathode ray tube and the projection lens can be performed accurately and readily by controlling the configuration of the angle adjustment spacing member.

As a result, a projection tube of an enhanced focusing performance has been successfully realized.

Also, it has been made possible to project respective video images of red color, green color and blue color to specified places on a screen accurately by employing a plurality of projection tubes for red color, green color and blue color, resulting in a successful realization of a video projection system having an excellent focusing performance and fine picture quality.

Moreover, in the production of three different projection tubes of red color, green color and blue color with slant angles different from one another, the shapes of respective radiators can be made identical with one another, and a metal die for production of the radiators can be commonly used.

As a result, the production cost of the radiators can be effectively reduced.

Another projection tube of the present invention comprises a cathode ray tube, a projection lens disposed in front of the face plane of the cathode ray tube, a radiator having side walls, height of which is different from one another so as to make slanting caused by the walls of the radiator one half the slant angle between the cathode ray tube and the projection lens, a solution filled in the hollow surrounded by the face plane of the cathode ray tube, the projection lens and the radiator, a sealing member placed between the projection lens and the radiator, an angle adjustment spacing member placed between the face plane of the cathode ray tube and the radiator and having a thickness changing from place to place in order to reduce the slant angle to one half, and an odd shape sealing member disposed between the face plane of the cathode ray tube and the radiator to prevent leakage of the solution. According to the foregoing structures, both the slant angle adjustment and the axis alignment between the cathode ray tube and the projection lens can be performed accurately and readily by controlling the shape of both the radiator and the angle adjustment spacing member.

As a result, a projection tube of an enhanced focusing performance has been successfully realized.

Also, in the production of three different projection tubes of red color, green color and blue color with a slant angle different from one another, shapes of the respective radiators and angle adjustment spacing members can be made identical with one another, and a metal die for production of the radiators can be commonly used.

As a result, the production cost of the radiators can be greatly and effectively reduced.

Still another projection tube of the present invention comprises a cathode ray tube, a projection lens disposed in front of the face plane of the cathode ray tube, a radiator arranged between the face plane of the cathode ray tube and the projection lens, a solution filled in the hollow surrounded by the face plane of the cathode ray tube, the projection lens and the radiator a sealing member placed between the projection lens and the radiator, an angle adjustment spacing member placed between the face plane of the cathode ray tube and the radiator for controlling a slant angle between the cathode ray tube and the projection tube a projected member formed by fixing on a side part of the angle adjustment spacing material for controlling the position of the cathode ray tube, and an odd shape sealing member disposed between the face plane of the cathode ray tube and the radiator to prevent leakage of the solution.

According to the foregoing structures, both the slant angle adjustment and the axis alignment between the cathode ray tube and the projection lens can be performed accurately and readily by controlling the configuration of the angle adjustment spacing member, and a further adjustment of the position of the cathode ray Lube can be made accurately on account of the projected part fixed on the spacing member.

As a result, a projection tube of a further enhanced focusing performance has been successfully realized.

DETAILED DESCRIPTION OF THE INVENTION

A detailed explanation will be made on the present invention with the help of examples.

EXAMPLE 1

Figure 1:
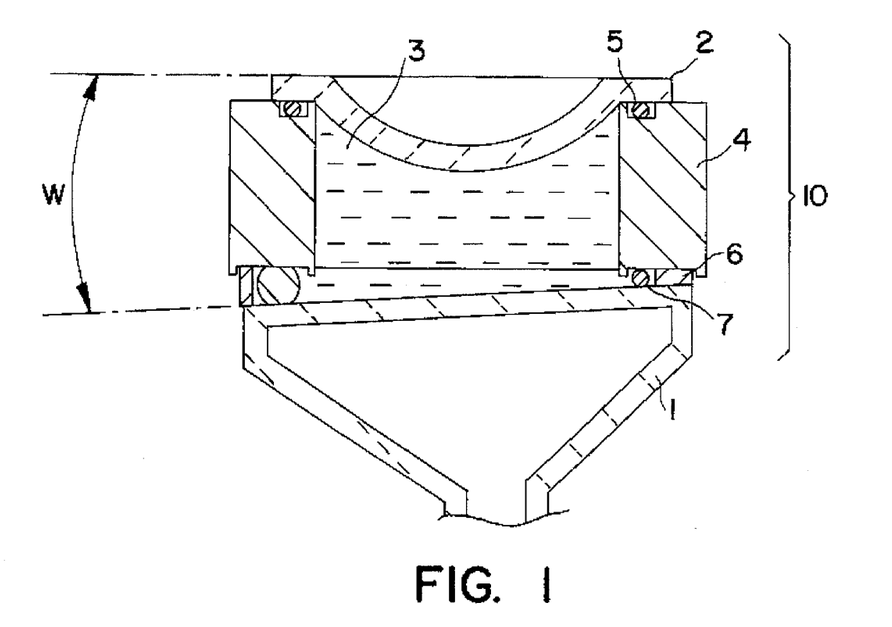
FIG. 1 is a cross-sectional view of the main part of an example of the projection tube of the present invention.

FIG. 1 is a cross-sectional view to show schematically the main part of an example of the projection tube of the present invention.

In FIG. 1, a projection lens 2 is arranged in front of the face plane of a cathode ray tube 1.

A radiator 4 (sometimes referred to as a solution containing vessel) is disposed between the face plane of the cathode ray tube 1 and the projection tube 2.

A solution 3 is filled in the hollow surrounded by the face plane of the cathode ray tube 1, the projection tube 2 and the radiator 4.

A sealing member 5 is installed on the end surface of the radiator 4 at a peripheral position where the projection lens 2 and the radiator 4 meet opposite to each other, and the projection tube 2 and the radiator 4 are put together by mechanical sealing through the sealing member 5. An angle adjustment spacing member 6 which was prepared to have a configuration with a specified thickness is placed between the opposing surfaces of the cathode ray tube 1 and radiator 4.

Also, an odd shape sealing member 7 is placed on the end surface of the radiator 4 at a position inside the periphery of the angle adjustment spacing member 6, and the cathode ray tube and radiator 4 are put together by mechanical sealing.

Both the angle adjustment spacing member 6 and the odd shape sealing member 7 are of an odd configuration with the thickness thereof varied from place to place in accordance with a slant angle (W) between the cathode ray tube 1 and the projection tube 2.

The slant angle (W) between the cathode ray tube 1 and the projection lens 2 is adjusted by the configuration of the angle adjustment spacing member 6.

According to the foregoing structures, one projection tube 10 is constructed for completion.

The cathode ray tube 1 plays the role of showing video images on the surface plane thereof, and comprises various components contained inside thereof for generating video images.

Glass, for example, is used as the material for the surface plane of the cathode ray tube 1.

The solution 3 cools down the temperature rise due to the heat generated by the cathode ray tube 1, and at the same time serves the function of controlling contrast of video images.

As the material for the solution 3 is used such a material as ethylene glycol, diethylene glycol, glycerin or the like, the refractive index of which is similar to those of the cathode ray tubs material and projection lens material.

The projection lens 2 enlarges the video images produced on the face plane of the cathode ray tube 1, and projects the enlarged video images to specified places on a screen (not shown in FIG. 1).

As the material for the projection lens 2 is used, for example, glass or transparent plastics such as acrylic resin, polycarbonate resin and the like.

The radiator 4 serves as the side walls for holding the solution 3.

As the material for the radiator 4 is used, for example, such metals as iron, aluminum, stainless-steel and the like, or mechanically strong plastic materials.

The side wall height of the radiator 4 changes depending on the places along the periphery thereof in accordance with product design.

The height may be the same all around the periphery, and sometimes may vary from place to place.

It is also possible Lo form grooves on the end surface of the radiator 4, where the radiator 4 opposes to the cathode ray tube 1, in order to have an angle adjustment spacing member 6 and an odd shape sealing member 7 held therein. Further, it is also possible to form grooves on the other end surface of the radiator 4, where the radiator 4 opposes to the projection tube 2, in order to have a sealing member 7 held therein.

The angle adjustment spacing member 8 serves the function of performing slant angle adjustment and axis alignment between the cathode ray Lube I and the projection tube 2.

As is material is used, for example, such a metal as iron, aluminum, stainless-steel or the like, a plastic material, a hard rubber material and the like, which can stay undeformed over the long period.

Figure 2:
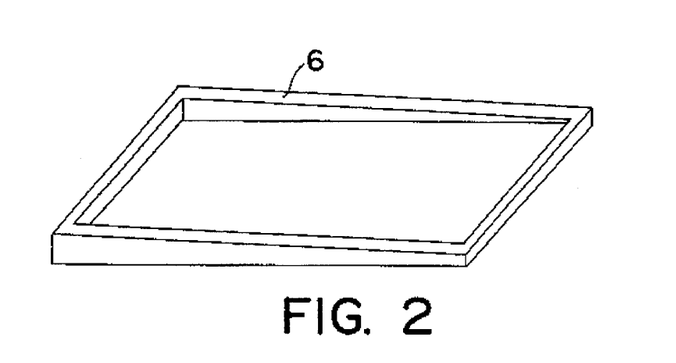
FIG. 2 is an outline illustration of the main part of an example of the angle adjustment spacing member as shown in FIG. 1.
Figure 3:
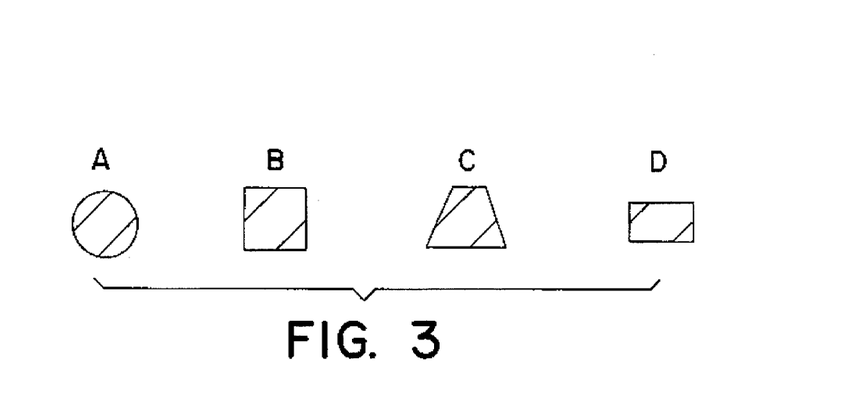
FIG. 3 shows enlarged cross-sectional views of examples of the odd shape sealing members as appear in FIG. 1.

FIG. 2 shows the configuration of an example of the angle adjustment spacing member 6.

The configuration thereof should be of a shape to hold the projection angle firmly and in an stabilized manner. As illustrated in FIG. 2, for example an angle adjustment spacing member 6 can be shaped like a rectangle with the four sides thereof formed into a continuous single body, yet matching with the radiator 4 in configuration. However, the height of each respective side has to be varying from place to place.

In place of the continuous single body, into which the foregoing angle adjustment spacing member 6 was formed, a configuration chopped up partially can also be used.

Besides, the cross-section of the spacing member 6 can be, for example, a square, a regular square, a trapezoid or a polygon.

The odd shape sealing member 7 serves the function of preventing leakage of the solution 3.

As the material thereof can be used a material that is chemically resistant to the solution 3 and durable for a long time as a sealing member, such as plastic materials, rubber materials, inorganic materials or the like, all having some elasticity.

As the typical configuration of the odd shape sealing member 7 is preferred a continuously solid material shaped like a rectangle so as to match with the face plane configuration of the cathode ray tube 1.

The thickness thereof varies from place to place according to the required slant angle. As a result, the odd shape sealing member 7 becomes odd in shape, not having a uniform thickness throughout the entire length thereof.

The complete structure thereof can be constructed like a molded sealing structure similar to a rectangle in configuration.

Particularly, a structure formed into a molded body shaped like a rectangle is preferred as the odd shape sealing member 7 which is disposed between the face plane of the cathode ray tube and the radiator 4, and fixed by compression.

The cross-sectional view of the foregoing molded body looks like, for example, a circle, a triangle, a square, a trapezoid or a polygon as shown in FIG. 3A to FIG. 3D.

An O-ring shape with a circular cross-section is particularly preferred.

It is also possible to place the odd shape sealing member 7 outside of the angle adjustment spacer material 6 instead of inside thereof.

Further, it is also possible to apply or fill in a sealing member to the gaps existing in the space between the cathode ray tube 1 and the radiator 4, where the angle adjustment spacing member 6 is disposed, for a sealing purpose instead of employing the odd shape sealing member 7.

The sealing member 5 serves the function of preventing leakage of the solution 3.

There are no particular restrictions imposed on the material thereof, and a plastic material, a rubber material, an inorganic material or the like, all having some elasticity, can be used.

The complete structure of the sealing member 5 can be formed by use of a molded body shaped like a rectangle having a uniform thickness or by use of a structure of sealing member application or filling. Particularly, a structure, wherein a molded body shaped like a rectangle is fixed by compression, is preferred.

Video images produced on the face plane of the cathode ray tube 1 are enlarged by the projection lens 2, the angle of which is set at a specified slant angle by means of the angle adjustment spacing member 6 and the odd shape sealing member 7, after passing through the solution 3, and projected on a screen (not shown in FIG. 1) arranged in front of the projection lens.

On account of the foregoing structures, it has been made possible to perform the slant angle adjustment and axis alignment between the cathode ray tube 1 and the projection tube 2 accurately and readily with a good precision by controlling the configuration of the angle adjustment spacing member 6.

As a result, the focusing performance of the projection tube 10 has been effectively enhanced.

Also, with a video projection system using the foregoing projection tubes, the position of an image projected on the screen can be controlled accurately with a good precision.

Generally, the metal dies for the production of the angle adjustment spacing member and odd shape sealing member are less expensive than the metal die for the radiator production.

Meanwhile, the foregoing structures make it possible to standardize the metal die for the radiator production because the radiator shape is made common even if projection tube of different slant angles are employed.

As a result, the production cost of projection tubes is effectively reduced.

EXAMPLE 2

Figure 4:
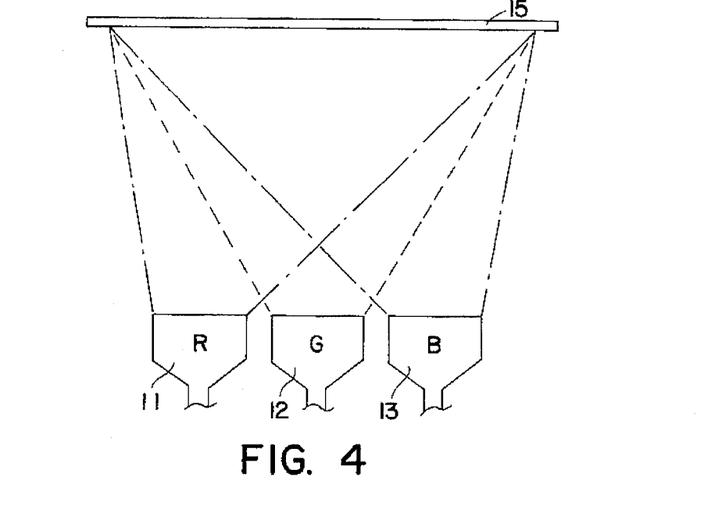
FIG. 4 is a schematic illustration of an example of the video projection system that uses projection tubes of the present invention.

FIG. 4 is a schematic illustration of an example of the video projection system that employs the projection tube of the foregoing example.

In FIG. 4, a projection tube 11 for red color imaging, a projection tube 12 for green color imaging, and a projection tube 13 for blue color imaging are disposed at specified places.

A screen 15 is installed at a specified position in front of these projection tubes 11, 12 and 13.

Each respective projection tube 11, 12 or 13 is constructed as described in Example 1.

The slant angles of the projection tubes 11, 12 and 13 are adjusted respectively to an angle different from one another so as to have the respective enlarged video images of red color, green color and blue color projected to specified places on the screen 15.

With the video projection system thus structured, each respective video image of red color, green color or blue color is projected to a specified position on the screen accurately with a good precision by respective projection tubes of three kinds.

As a result, a video projection system of an excellent performance and good picture quality can be realized.

Although the arrangement of the projection tubes is made in such a manner as to have the green color projection tube placed in the center with the present Example 2, it is also possible to have either the red color projection tube or the blue color projection tube placed in the center position, instead.

EXAMPLE 3

Next, another exemplary embodiment of the present invention for a projection tube will be explained.

A video projection system is formed of three kinds of projection tube. In that case, a green color projection tube is placed in the center, and a red color projection tube and a blue color projection tube are arranged to be placed at either side of the green color projection tube, respectively.

The slant angle of the green color projection tube disposed in the center is 0°, while the slant angles of both the red color projection tube and blue color projection tube being W.

However, the directions of the slant angles of the red color projection tube and blue color projection tube are symmetrical to each other with respect to the center of the video projection system.

Figure 5A:
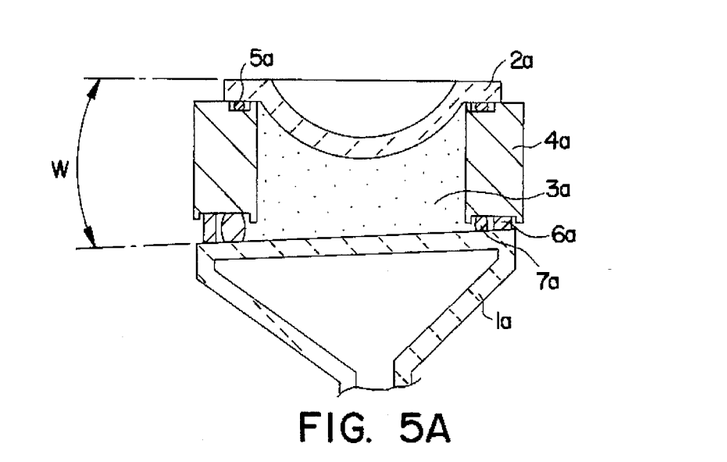
FIG. 5A is a cross-sectional view of the main part of another example of the projection tube of the present invention.
Figure 5B:
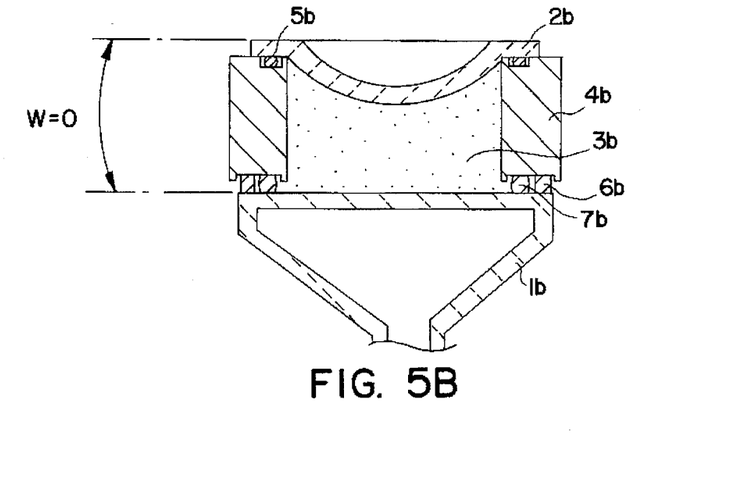
FIG. 5B is a cross-sectional view of the main part of a projection tube which has a slant angle of 0°.
Figure 5C:
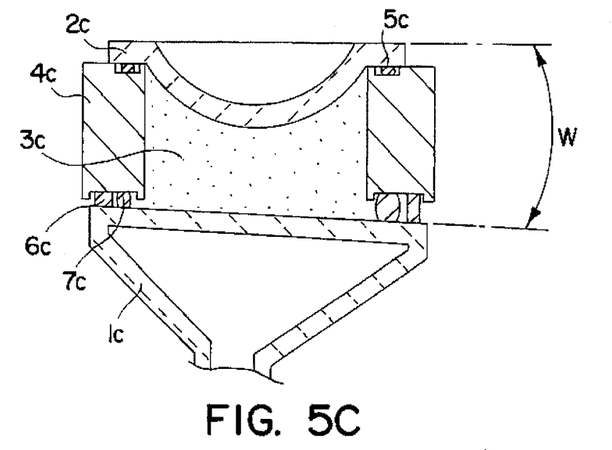
FIG. 5C is a cross-sectional view of the main part of a projection tube which is the same as the one shown in FIG. 5A except for having the positions of all the odd shape sealing members and angle adjustment spacing members turned by 180° around the center line of the projection tube.

The cross-sectional views of the main portions of the red color projection tube, green color projection tube and blue color projection tube for a video projection system thus structured are shown in FIG. 5A, FIG. 5B and FIG. 5C, respectively.

FIG. 5A relates to a red color projection tube, FIG. 5B to a green color projection tube and FIG. 5C to a blue color projection tube.

In FIG. 5A, FIG. 5B and FIG. 5G, the shapes of the cathode ray tube 1a, cathode ray tube 1b and cathode ray tube 1c are identical with one another.

Also, the configurations of the radiator 4a, radiator 4b and radiator 4c are arranged so as to have the heights of the side walls thereof made equal to one another for the entire periphery of the respective walls.

In the same manner as above, the configurations of the projection lenses 2a, 2b and 2c, the radiators 4a, 4b and 4c, and the sealing members 5a, 5b and 5c are made identical with one another, respectively.

Further, the materials for the solutions 3a, 3b and 3c are the same with one another.

The thickness of the angle adjustment spacing member 6a as shown in FIG. 5A varies from place to place so as to make the slant angle equal to a specified angle W, and the configuration thereof shows an inclination along the direction of its thickness.

The configuration of the odd shape sealing member 7a is established so as to prevent leakage of the solution 3a by adjusting the thickness thereof according to the thickness of the angle adjustment spacing member 6a.

The angle adjustment spacing member 6b and odd shape sealing member 7b as shown in FIG. 5B are of a uniform thickness throughout the entire periphery thereof.

The configurations of the angle adjustment spacing member 6c and odd shape sealing member 7b as shown in FIG. 5C are established in such a way as to have the projection angle of the projection tube as shown in FIG. 5C shifted in a direction opposite to that as shown in FIG. 5A by the same angle as the slant angle (W).

In other words, the angle adjustment spacing member 6c and odd shape sealing member 7c for the present blue color projection tube are of the same configurations as the angle adjustment spacing member 6a and odd shape sealing member 7c for the red color projection tube with only the positions thereof rotated from those of the latter by 180°.

As a result, the radiator configuration of the red color projection tube can be made the same as that of the blue color projection tube, thereby effectively contributing to a reduction in production cost.

Although the arrangement of the projection tubes is made in such a manner as to have the green color projection tube placed in the center with the present Example 3, it is also possible to have either the red color projection tube or the blue color projection tube placed in the center position, instead.

EXAMPLE 4

Next, still another exemplary embodiment of the present invention for a projection tube will be explained.

The projection tube of Example 4 is different from that of Example 3 in the configurations of the radiator, angle adjustment spacing member, and odd shape sealing member.

A video projection system is formed of three kinds of projection tube. In that case, a green color projection tube is placed in the center, and a red color projection tube and a blue color projection tube are arranged to be placed at either side of the green color projection tube.

The slant angle of the green color projection tube disposed in the center is 0°, while the slant angles of both the red color projection tube and blue color projection tube being W.

However, the directions of the slant angles of the red color projection tube and blue color projection tube are symmetrical to each other with respect Lo the center of the video projection system.

Figure 6A:
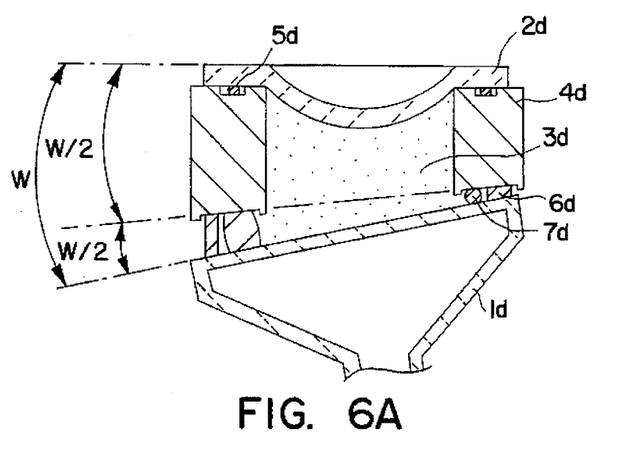
FIG. 6A is a cross-sectional view of the main part of still another example of the projection tube of the present invention.
Figure 6B:
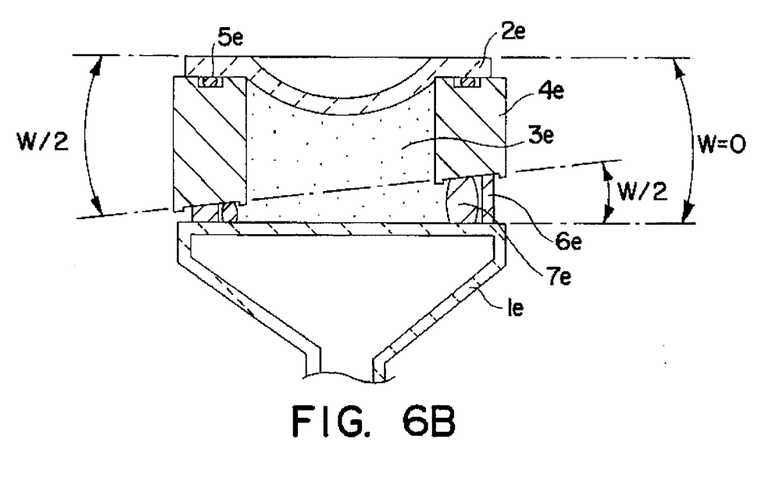
FIG. 6B is a cross-sectional view of the main part of a projection tube, which was built by using the same elements as shown in FIG. 6A, to make the slant angle equal to 0°.
Figure 6C:
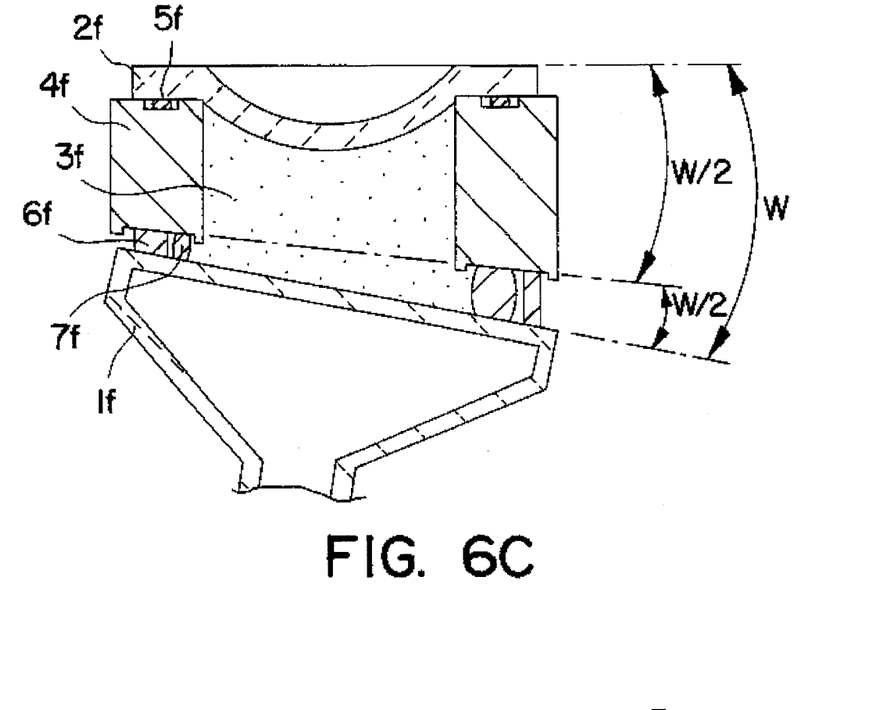
FIG. 6C is a cross-sectional view of the main part of a projection tube which was built in the same way by using the same elements as shown in FIG. 6A except for making the slant angle symmetrical to that of the projection tube as shown in FIG. 6A with respect to the center line of the projection tube.

The cross-sectional views of the main portions of another example of the red color projection tube, green color projection tube and blue color projection tube for a video projection system thus structured are shown in FIG. 6A, FIG. 6B and FIG. 6C, respectively.

FIG. 6A relates to a red color projection tube, FIG. 6B to a green color projection tube and FIG. 6C to a blue color projection tube.

In FIG. 6A, FIG. 6B and FIG. 6C, the shapes of the cathode ray tube 1d, cathode ray tube 1e and cathode ray tube 1f are identical with one another.

In the same manner as above, the configurations of the projection lenses 2d, 2e and 2f, and the sealing members 5d, 5e and 5f are made identical with one another, respectively.

Further, the materials for the solutions 3d, 3e and 3f are the same with one another.

Further, the configurations of the radiators 4d, 4e and 4f, the angle adjustment spacing members 6d, 6e and 6f, and the odd shape sealing members 7d, 7e and 7f are identical with one another, respectively.

The thickness of the angle adjustment spacing member 6d as shown in FIG. 6A varies from place to place so as to make a ½ angle of the specified slant angle (W), and the configuration thereof shows an inclination along the direction of its thickness.

In other words, the configuration of the angle adjustment spacing member 6d is made so as to have the angle between the part of the maximum thickness and that of the minimum thickness made equal to ½ of the specified slant angle (W).

The configuration of the odd shape sealing member 7d is formed so as to prevent leakage of the solution 3d by adjusting the thickness thereof according to the thickness of the angle adjustment spacing member 6d.

Also, the configuration of the radiator 4d is established so as to make its slant angle ½ of the specified slant angle (W) by having the height of the side walls thereof varied from place to place, and the configuration thereof shows an inclination along the direction of its height.

In other words, an angle adjustment spacing member 6d with the thickness thereof varying from place to place and a radiator 4d with the height thereof varying from place to place are combined to present a specified slant angle (W).

In FIG. 6B, the same configurations as used in the projection tube shown in FIG. 6A are used for the radiator 4e, angle adjustment spacing member 6e and odd shape sealing member 7e.

In this case, the projection tube is constructed by having the radiator 4e put together with the angle adjustment spacing member 6e with the former's maximum height position matched with the latter's minimum thickness position.

As a result, the slant angle between the cathode ray tube 1e and the projection lens 2e is made equal to 0°.

In FIG. 6C, the same configurations as used in the projection tube shown in FIG. 6A are used for the radiator 4f angle adjustment spacing member 6f and odd shape sealing member 7f.

The configuration of the angle adjustment spacing member 6f is established so as to make the slant angle one half of the specified slant angle (W) by having the thickness thereof varied from place to place, and shows an inclination along the direction of its thickness.

In other words, the configuration of the angle adjustment spacing member 6f is made so as to have the angle between the part of the maximum thickness and that of the minimum thickness made equal to ½ of the specified slant angle (W).

Also, the configuration of the radiator 4f is established so as to make its slant angle ½ of the specified slant angle (W) by having the height of the side walls thereof varied from place to place, and the configuration thereof shows an inclination along the direction of its height.

In other words, an angle adjustment spacing member 6f with the thickness thereof varying from place to place and a radiator 4d with the height thereof varying from place to place are combined to present a specified slant angle (W).

Thus, the angle adjustment spacing member 6f and odd shape sealing member 7f for the present blue color projection tube are of the same configurations as the angle adjustment spacing member 6d and odd shape sealing member 7d for the red color projection tube with only the positions thereof rotated from those of the latter by 180°.

Therefore, all the configurations of the component elements such as radiators, angle adjustment spacing members and the like for the respective red color, green color and blue color projection tubes can be made the same. As a result, an effective reduction in production cost has been realized.

Although the arrangement of the projection tubes is made in such a way as to have the green color projection tube placed in the center with the present Example 4, it is also possible to have either the red color projection tube or the blue color projection tube placed in the center position, instead.

EXAMPLE 5

Figure 7:
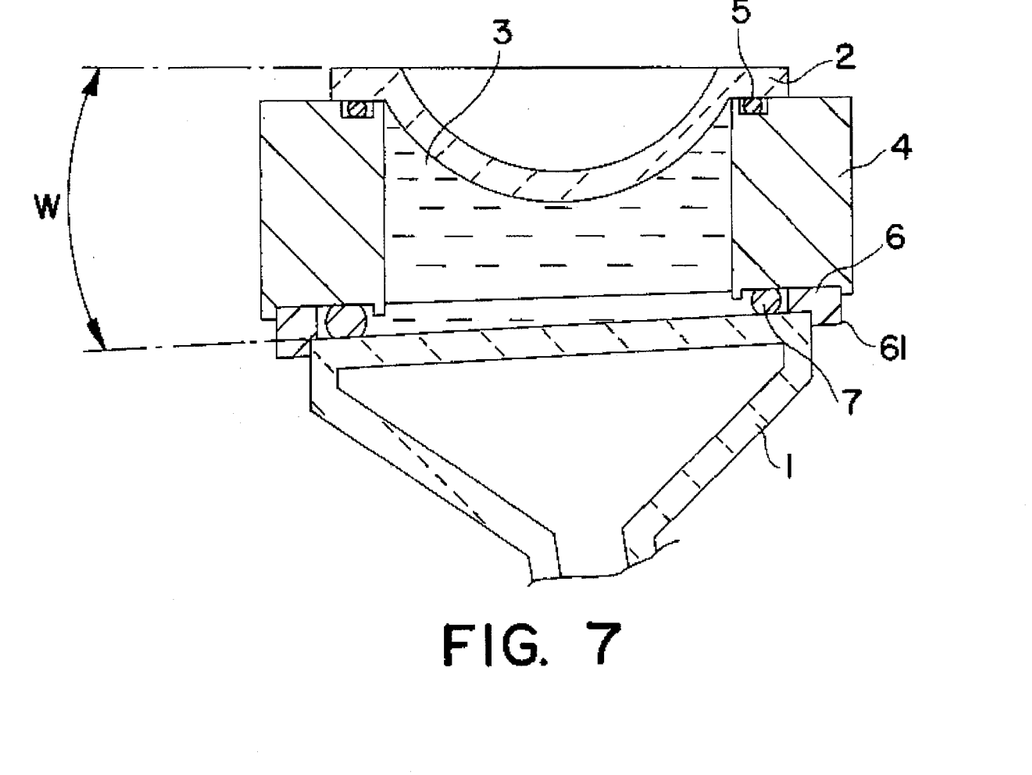
FIG. 7 is a cross-sectional view of the main part of still another example of the projection tube of the present invention.

FIG. 7 is a cross-sectional view of the main part of still another example of the projection tube of the present invention, which is characterized by use of an angle adjustment spacing member having a projection.

In FIG. 7, a projection lens 2 is arranged in front of the face plane of a cathode ray tube 1.

A radiator 4 is disposed between the face plane of the cathode ray tube 1 and the projection tube 2.

A solution 3 is filled in the hollow surrounded by the face plane of the cathode ray tube 1, the projection tube 2 and the radiator 4.

A sealing member 5 is installed on the end surface of the radiator 4 at a peripheral position where the projection lens 2 and the radiator 4 meet opposite to each other, and the projection tube 2 and the radiator 4 are put together by mechanical sealing through the sealing member 5.

An angle adjustment spacing member 6, which was prepared to have a specified projection 61 and a configuration with a specified thickness, is placed at a peripheral position between the opposing surfaces of the cathode ray tube 1 and radiator 4. The angle adjustment spacing member 6 is of an odd configuration with its thickness varied from place to place in order to present a slant angle (W) between the cathode ray tube 1 and the projection lens 2.

Also, the projection 61 is fixed on the peripheral surface of the angle adjustment spacing member 6, kept in contact with the outer periphery of the cathode ray tube 1, and is of a shape to facilitate alignment of the position of the cathode ray tube 1.

Thus, the angle adjustment spacing member 6 having the projection 61 serves the function of adjusting the slant angle (W) and controlling the position of the cathode ray tube 1.

An odd shape sealing member 7 is placed between the cathode ray tube 1 and the radiator 4, and at a position inside of the angle adjustment spacing member 6.

The odd shape sealing member 7 has a unique configuration with its thickness varied from place to place in accordance with the slant angle (W).

The space between the cathode ray tube 1 and the radiator 4 is mechanically sealed by means of the foregoing odd shape sealing member 7.

No particular restrictions are imposed on the configuration of the projection 61, and it should be of a shape to facilitate alignment of the position of the cathode ray tube 1. There are no particular positions required of the projection 61 to be installed, and it can be disposed, for example, on the corners or the specified places of the sides along the periphery of the cathode ray tube 1, or on the entire periphery of the cathode ray tube 1.

Figure 8A:
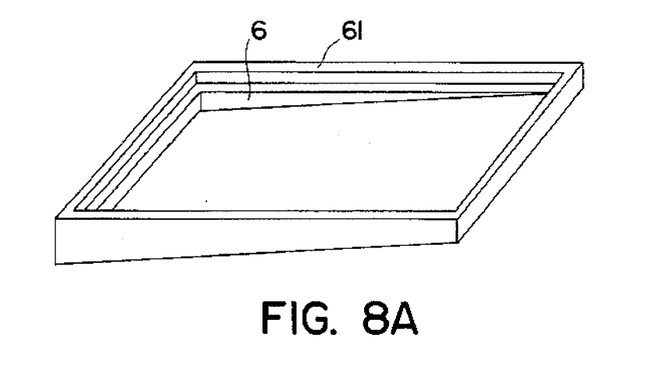
FIG. 8A and FIG. 8B show out-line illustrations of examples of the angle adjustment spacing member as shown in FIG. 7.
Figure 8B:
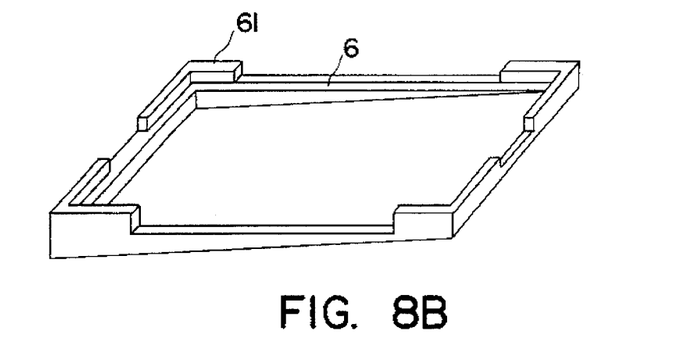

FIG. 8A and FIG. 8B show examples of the angle adjustment spacing member having a projection.

FIG. 8A shows an angle adjustment spacing member 6 of a rectangular shape and with a projection 61 formed on the entire periphery thereof.

FIG. 8B shows an angle adjustment spacing member 6 of a rectangular shape and with projections 61 formed at the corners along the periphery thereof.

According to the foregoing structures, both the slant angle adjustment and axis alignment between the cathode ray tube 1 and the projection tube 2 can be conducted accurately with a high precision. The adjustment in position of the cathode ray tube can also be performed accurately. As a result, the focusing performance of the projection tubes is much more enhanced effectively.

What is claimed:

1. A projection tube, including a cathode ray tube having a face plane comprising:

a projection lens disposed in front of the face plane of said cathode ray tube;

a radiator arranged between the face plane of said cathode ray tube and said projection lens, whereto the radiator includes a side wall for radiating heat energy and the height of the side wall is greater than the thickness of the side wall;

a solution filled in a hollow formed by the face plane of said cathode ray tube, said projection lens and said radiator;

a first sealing member placed between said projection lens and said radiator;

a generally frame shaped angle adjustment spacing member placed between the face plane of said cathode ray tube and said radiator for establishing an angular relationship between said cathode ray tube and said projection lens, said angle adjustment spacing member having a maximum height less than the height of the side wall of said radiator, wherein said angle adjustment spacing member varies in thickness along its periphery in accordance with the angle between said cathode ray tube and said projection lens; and a second sealing member disposed between and in contact with the face plane of said cathode ray tube and said radiator, for preventing leakage of said solution, wherein said second sealing member varies in thickness along its periphery in accordance with the angle between said cathode ray tube and said projection lens before said second sealing member is disposed between the face plane of said cathode ray tube and said radiator.

2. The projection tube according to claim 1, wherein the second sealing member is substantially O-ring shaped.

3. A video projection system comprising:

a plurality of projection tubes each including:

a cathode ray tube having a face plane a projection lens disposed in front of the face plane of said cathode ray tube;

a radiator arranged between the face plane of said cathode ray tube and said projection lens, wherein the radiator includes a side wall for radiating heat energy and the height of the side wall is greater than the thickness of the side wall;

a solution filled in a hollow formed by the face plane of said cathode ray tube, said projection lens and said radiator;

a first sealing member placed between said projection lens and said radiator;

a generally frame shaped angle adjustment spacing member placed between the face plane of said cathode ray tube and said radiator for establishing an angular relationship between said cathode ray tube and said projection lens, said angle adjustment spacing member having a maximum height less than the height of the side wall of said radiator, wherein said angle adjustment spacing member varies in thickness along its periphery in accordance with the angle between said cathode ray tube and said projection lens; and a second sealing member disposed between and in contact with the face plane of said cathode ray tube and said radiator, for preventing leakage of said solution, wherein said second sealing member varies in thickness along its periphery in accordance with the angle between said cathode ray tube and said projection lens before said second sealing member is disposed between the face plane of said cathode ray tube and said radiator;

wherein a screen is disposed in front of said plurality of projection tubes.

4. The video projection system according to claim 3, wherein said plurality of projection tubes includes at least one of a red color projection tube, a green color projection tube and a blue color projection tube, each with a slant angle differing from one another.

5. A projection tube, including a cathode ray tube having a face plane, comprising:

a projection lens disposed in front of the face plane of said cathode ray tube;

a radiator between the face plane of said cathode ray tube and said projection lens, said radiator having side walls of substantially equal height throughout its entire periphery, wherein the radiator radiates heat energy and the height of the side wall is greater than the thickness of the side wall;

a solution filled in a hollow formed by the face plane of said cathode ray tube, said projection lens and said radiator;

a first sealing member placed between said projection lens and said radiator;

a generally frame shaped angle adjustment spacing member placed between the face plane of said cathode ray tube and said radiator, having varied thickness for establishing an angular relationship between said cathode ray tube and said projection lens, said angle adjustment spacing member having a maximum height less than the height of the side wall of said radiator; and a second sealing member disposed between and in contact with the face plane of said cathode ray tube and said radiator, having varied thickness for preventing leakage of said solution, wherein said second sealing member is substantially O-ring shaped and varies in thickness along its periphery in accordance with the angle between said cathode ray tube and said projection lens before said second sealing member is disposed between the face plane of said cathode ray tube and said radiator.

6. A video projection system comprising:

a plurality of projection tubes including a first projection tube, a second projection tube and a third projection tube each including:

a cathode ray tube having a face plane;

a projection lens disposed in front of the face plane of said cathode ray tube;

a radiator arranged between the face plane of said cathode ray tube and said projection lens, said radiator having side walls of substantially equal height throughout its entire periphery, wherein the radiator radiates heat energy and the height of the side wall is greater than the thickness of the side wall;

a solution filled in a hollow formed by the face plane of said cathode ray tube, said projection lens and said radiator;

a first sealing member placed between said projection lens and said radiator;

a generally frame shaped angle adjustment spacing member placed between the face plane of said cathode ray tube and said radiator for establishing an angular relationship between said cathode ray tube and said projection lens, said angle adjustment spacing member having a maximum height less than the height of the side wall of said radiator, wherein said angle adjustment spacing member varies in thickness along its periphery in accordance with the angle between said cathode ray tube and said projection lens; and a second sealing member disposed between the face plane of said cathode ray tube and said radiator, for preventing leakage of said solution, wherein said second sealing member varies in thickness along its periphery in accordance with the angle between said cathode ray tube and said projection lens before said second sealing member is disposed between the face plane of said cathode ray tube and said radiator;

the angle adjustment spacing member of said first projection tube and second projection tube each of variable thickness along their respective peripheries and each oppositely oriented relative to each other in their placement in the first projection tube and second projection tube;

the angle adjustment spacing member of said third projection tube having a thickness substantially the same throughout its entire periphery; and a screen disposed in front of said first, second and third projection tubes, wherein the shape of the radiator and the shape of the angle adjustment spacing member of said first projection tube are the same as the shape of the radiator and the shape of the angle adjustment spacing member of said second projection tube.

7. The video projection system according to claim 6, wherein the first projection tube is a red color projection tube, the second projection tube is a blue color projection tube, and the third projection tube is a green color projection tube.

8. A projection tube, including a cathode ray tube having a face plane comprising:

a projection lens disposed in front of the face plane of said cathode ray tube;

a radiator placed between the face plane of said cathode ray tube and said projection lens, having side walls with varied height in order to account for ½ of a slanting angle between said cathode ray tube and said projection lens;

a solution filled in a hollow formed by the face plane of said cathode ray tube, said projection lens and said radiator;

a first sealing member placed between said projection lens and said radiator;

an angle adjustment spacing member placed between the face plane of said cathode ray tube and said radiator, having varied thickness in order to account for ½ of said slanting angle; and a second sealing member placed between the face plane of said cathode ray tube and said radiator, for preventing leakage of said solution, wherein said second sealing member varies in thickness along its periphery in accordance with the angle between said cathode ray tube and said projection lens before said second sealing member is disposed between the face plane of said cathode ray tube and said radiator.

9. A video projection system comprising:

a plurality of projection tubes including a first projection tube, a second projection tube and a third projection tube each including:

a cathode ray tube having a face plane;

a projection lens disposed in front of the face plane of said cathode ray tube;

a radiator arranged between the face plane of said cathode ray tube and said projection lens, having a shorter side wall portion and a longer side wall portion in order to account for ½ of an slanting angle between said cathode ray tube and said projection lens;

a solution filled in a hollow formed by the face plane of said cathode ray tube, said projection lens and said radiator;

a first sealing member placed between said projection lens and said radiator;

an angle adjustment spacing member placed between the face plane of said cathode ray tube and said radiator, having varied thickness in order to account for ½ of said slanting angle between said cathode ray tube and said projection lens; and a second sealing member disposed between the face plane of said cathode ray tube and said radiator, for preventing leakage of said solution, wherein said second sealing member varies in thickness along its periphery in accordance with the angle between said cathode ray tube and said projection lens before said second sealing member is disposed between the face plane of said cathode ray tube and said radiator;

both the radiator and the angle adjustment spacing member of said first projection tube oppositely oriented relative to both the radiator and the angle adjustment spacing member of said second projection tube in their respective placement in the first projection tube and the second projection tube.

one of the radiator and the angle adjustment spacing member of said third projection tube oriented identically to one of the radiator and the angle adjustment spacing member of the first projection tube, respectively, while the other of the radiator and the angle adjustment spacing member of said third projection tube oriented oppositely to the other of the radiator and the angle adjustment spacing member of the first projection tube, respectively, and a screen disposed in front of the first, second and third projection tubes.

10. The video projection system according to claim 9, wherein the first projection tube is a red color projection tube, the second projection tube is a blue color projection tube, and the third projection tube is a green color projection tube.

11. A projection tube including a cathode ray tube having a face plane, comprising:

a projection lens disposed in front of the face plane of said cathode ray tube;

a radiator arranged between the face plane of said cathode ray tube and said projection lens, wherein the radiator includes a side wall for radiating heat energy and the height of the side wall is greater than the thickness of the side wall;

a solution filled in a hollow formed by the face plane of said cathode ray tube, said projection lens and said radiator;

a first sealing member placed between said projection lens and said radiator;

a generally frame shaped angle adjustment spacing member placed between the face plane of said cathode ray tube and said radiator for establishing an angular relationship between said cathode ray tube and said projection lens, said angle adjustment spacing member having a maximum height less than the height of the side wall of said radiator, wherein said angle adjustment spacing member varies in thickness along its periphery in accordance with the angle between said cathode ray tube and said projection lens;

a projection formed on a periphery of said angle adjustment spacing member for positioning said cathode ray tube and fixing axial alignment between the cathode ray tube and the projection lens; and a second sealing member disposed between the face plane of said cathode ray tube and said radiator for preventing leakage of said solution, wherein said second sealing member is substantially O-ring shaped and varies in thickness along its periphery in accordance with the angle between said cathode ray tube and said projection lens before said second sealing member is disposed between the face plane of said cathode ray tube and said radiator.

12. The projection tube according to claim 11, wherein the projection is formed throughout the entire periphery of said angle adjustment spacing member.

* * * * *

UNITED STATES PATENT AND TRADE MARK OFFICE
CERTIFICATE OF CORRECTION

PATENT NO.   : 5,585,867
DATED        : December 17, 1996
INVENTOR(S)  : Ooya

It is certified that error appears in the above-identified patent and that said Letters Patent is hereby corrected as shown below:

Column 11, line 51, "whereto" should be --wherein--.

Column 14, line 47, "an" should be --a--.

Signed and Sealed this

Twenty-fourth Day of June, 1997

*Attest:*

BRUCE LEHMAN

*Attesting Officer*     *Commissioner of Patents and Trademarks*